United States Patent [19]

Tomitaka et al.

[11] Patent Number: 5,546,125
[45] Date of Patent: Aug. 13, 1996

[54] VIDEO SIGNAL FOLLOW-UP PROCESSING SYSTEM

[75] Inventors: Tadafusa Tomitaka, Chiba; Tsuneo Sekiya, Tokyo, both of Japan

[73] Assignee: Sony Corporation, Tokyo, Japan

[21] Appl. No.: 268,125

[22] Filed: Jul. 6, 1994

[30] Foreign Application Priority Data

Jul. 14, 1993 [JP] Japan .................................. 5-196954

[51] Int. Cl.⁶ ............................................. H04N 7/18
[52] U.S. Cl. ............................. 348/169; 348/30; 348/32
[58] Field of Search ........................... 348/169–172, 348/135–137, 149–157, 649–652, 214, 32, 30; H04N 7/18

[56] References Cited

U.S. PATENT DOCUMENTS

| 4,364,089 | 12/1982 | Woolfson | 348/169 |
|---|---|---|---|
| 4,583,186 | 4/1986 | Davis et al. | 364/526 |
| 4,718,089 | 1/1988 | Hayashi et al. | 382/17 |
| 4,907,075 | 3/1990 | Braudaway | 348/32 |
| 5,031,049 | 7/1991 | Toyama | 348/352 |
| 5,164,825 | 11/1992 | Kobayashi et al. | 348/441 |
| 5,333,070 | 7/1994 | Ichikawa | 348/652 |
| 5,347,371 | 9/1994 | Nishimura et al. | 348/228 |
| 5,412,487 | 5/1995 | Nishimura et al. | 358/452 |
| 5,416,848 | 5/1995 | Young | 382/191 |
| 5,430,809 | 7/1995 | Tomitaka | 348/169 |
| 5,473,369 | 12/1995 | Abe | 348/169 |

FOREIGN PATENT DOCUMENTS 0578508  1/1994  European Pat. Off. .

*Primary Examiner*—Tommy P. Chin
*Assistant Examiner*—Vu Le
*Attorney, Agent, or Firm*—William S. Frommer; Alvin Sinderbrand

[57] ABSTRACT

A video signal follow-up processing system for adaptively tracking to the moving of a subject. A detection feature pattern is formed through acquisition of brightness and hue frequency characteristic data based on pixel information in a detection measurement frame, a similarity calculation method, which can distinguish a reference measurement frame from other areas, is selected on the screen, and the position of a detection measurement frame with a feature pattern having the highest similarity with the standard feature pattern obtained from the reference measurement frame is determined, in order to change and control an image to be projected on the display screen based on the positional information of the detection measurement frame, so that the video signal follow-up processing system can adaptively track to the moving of the subject.

39 Claims, 13 Drawing Sheets

| DISTANCE CALCULATION \ ELEMENT OF DISTANCE VECTOR | Y | Hue | Hue+Y |
|---|---|---|---|
| EUCLIDEAN DISTANCE CALCULATION METHOD (HISTOGRAM EUCLIDEAN DISTANCE) | J1 | J2 | J3 |
| HAMMING DISTANCE CALCULATION METHOD (HISTOGRAM HAMMING DISTANCE) | J4 | J5 | J6 |
| INTEGRAL DISTANCE (AREA DISTANCE) CALCULATION METHOD (INTEGRAL HISTGRAM DISTANCE) | J7 | J8 | J9 |

FIG. 14

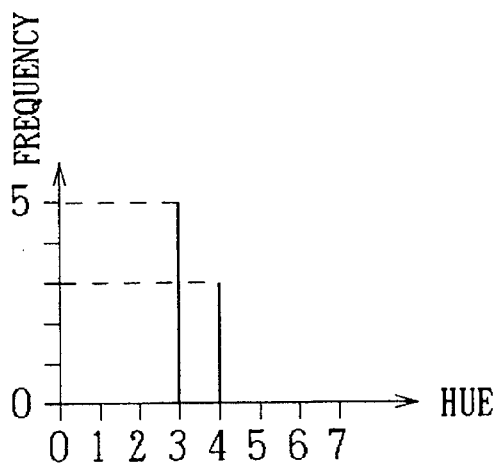

STANDARD FEATURE PATTERN
Hue(i)_std(i)
[0,0,0,5,3,0,0,0]

FIG. 15A

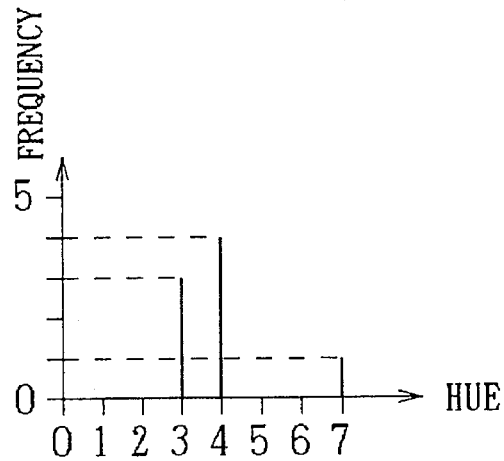

DETECTION FEATURE PATTERN
Hue(i)
[0,0,0,3,4,0,0,1]

FIG. 15B

VIDEO SIGNAL FOLLOW-UP PROCESSING SYSTEM

BACKGROUND OF THE INVENTION

1. Field of the Invention

This invention relates to a video signal follow-up processing system, and more particularly to an improvement of one which can take an optimal image by automatically following changes of a subject in the field of view of a video camera.

2. Description of the Related Art

As an apparatus for tracking changes of position of a subject in the field of view, there is a subject tracking apparatus in a video camera which automatically tracks the subject according to its movement. First, for a subject tracking device in a conventional video camera, an automatic subject tracking method has been disclosed in the Japanese Patent Application No. 207107/1992 filed on Jul. 10, 1992, which stores a peak value of high-frequency components of brightness signals in a measurement frame, and automatically tracks its movement as characteristics of the subject.

Secondly, an automatic subject tracking method has been disclosed in the Japanese Patent Application No. 322652/1992 filed on Nov. 7, 1992, which performs automatic tracking by forming a motion vector through matching of representative points for brightness signals of front and back fields in a measurement frame, and by assuming the motion vector as the movement of the subject.

The first automatic tracking method basically utilizes signals at peak, so that it is vulnerable to noise. Therefore the automatic tracking may not be attained in a shooting environment with low illuminance. Moreover, in principle, it extracts high-frequency components, so that the automatic tracking may not be attained for a subject with low contrast.

Furthermore, in the second automatic tracking method, it is difficult to determine whether the calculated motion vector is caused by movement of the hand on the video camera or by movement of the subject, so that a malfunction may arise in the practical use.

SUMMARY OF THE INVENTION

In view of the foregoing, an object of this invention is to provide a video signal follow-up processing system which can easily and surely perform automatic follow-up operation for movement of a subject by stably and effectively extracting features of the subject on a screen.

The foregoing object and other objects of the invention have been achieved by the provision of a video signal follow-up processing system, comprising: pixel information forming means (1, 5, 6, 7, 14, 26, 27) for forming pixel information constituting a display screen PIC based on pickup signals obtained through a lens block 1; reference measurement frame setting means (16, 17, 15, SP2) for setting a reference measurement frame FMXR with a predetermined size on a predetermined position on the display screen PIC; detection measurement frame setting means (16, 17, 15, SP3) for setting a detected measurement frame (FMXD) with a predetermined size on the display screen PIC; standard frequency characteristic data forming means (19, 20, 16, SP2) for forming standard frequency characteristic data YStd (i) and HueStd (i) for a brightness level and/or hue angle, based on brightness and/or hue information on an image in the reference measurement frame FMXR; detection frequency characteristic data forming means (19, 20, 16, SP3) for forming detection frequency characteristic data Y(x, y) (i) and Hue (x, y) (i) for a brightness level and/or hue angle, based on brightness and/or hue information on an image in the detected measurement frame (FMXD); similarity calculating means (16, SP12) for calculating the similarity of standard frequency characteristic data and/or detected frequency characteristic data by several methods; effective similarity calculation method selection means (16, SP13) for selecting the most effective similarity data on the screen among a plurality of similarities obtained from the similarity calculation; detection measurement frame determination means (16, SP5, SP15) for determining a detection measurement frame with a higher similarity by using the similarity calculation method selected by the effective similarity calculation method selection means; and pixel information modification control means (16, SP6) for controlling the pixel information forming means (1, 5, 6, 7) so as to match the position of the pixel information on the determined detection measurement frame with the position of the reference measurement frame.

The pixel information in the standard measurement frame FMXR on the subject is converted into the standard frequency characteristic data YStd (i) and HueStd (i) for the brightness level and/or hue angle by the standard frequency characteristic data forming means (19, 20, 16, SP2). The pixel information in the detection measurement frame (FMXD) is converted into the detection frequency characteristic data Y(x, y)(i) and Hue(x, y)(i) for the brightness level or hue angle by detection frequency characteristic data forming means (19, 20, 16, SP3). The similarity is found by several methods for the standard frequency characteristic data of the detection frequency characteristic data in the similarity calculation means (16, SP12, SP15). The most effective similarity calculation method for that image is determined in the effective similarity calculation method selection means (16, SP12). The detection frequency characteristic data, which has the highest similarity on the screen found by that calculation method, is determined by the detection measurement frame determination means (16, SP13, SP15). The drive of the pixel information forming means (1, 5, 6, 7) is controlled by the pixel information modification control means (16, SP6, SP16) so that the determined pixel information in the detection measurement frame is contained in the reference measurement frame.

Thus, as follow-up control can be performed to always contain a subject in the standard frame on the display screen, and the features of an image is arranged to be represented by using frequency characteristic data for that purpose. Therefore, it is possible to attain a video signal follow-up system that can be constructed in a relatively simple manner and that can surely follow up and operate.

As described above, according to this invention, it is possible to easily attain a video signal follow-up processing system that, when a subject moves in a field of view image, adaptively operates to such change so that the image to be projected on the display screen can surely follow the subject by selecting a similarity calculation method best suited within the screen based on the frequency characteristic data for brightness and hue information in a predetermined measurement frame, and by measuring the position of a detected measurement frame with a higher similarity through use of such method to control the position of the subject to be projected on the display screen.

The nature, principle and utility of the invention will become more apparent from the following detailed descrip-

BRIEF DESCRIPTION OF THE DRAWINGS

In the accompanying drawings:

FIG. 14 is a table listing nine types of similarity calculation methods;

FIGS. 15A and 15B are characteristic curvilinear diagrams explaining a specific similarity calculation method;

DETAILED DESCRIPTION OF THE EMBODIMENT

Preferred embodiments of this invention will be described with reference to the accompanying drawings:

1 First embodiment (1—1) Overall arrangement

Figure 1:
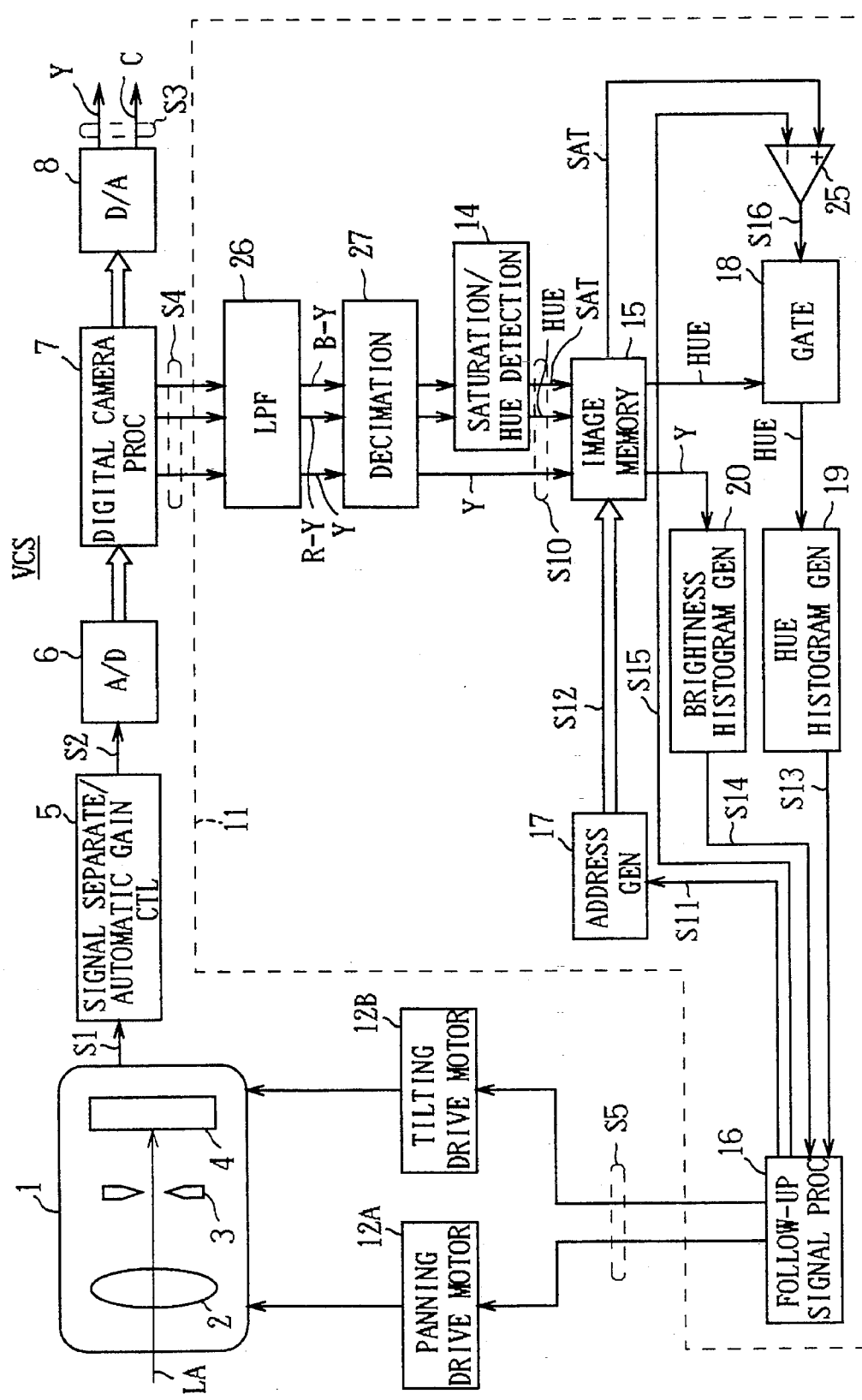
FIG. 1 is a block diagram illustrating a first embodiment of the video signal follow-up processing system according to this invention.

Referring to FIG. 1, VCS generally shows a video camera system. An image pickup light LA from a subject is image formed on an image pickup element 4, which consists of solid-state image pickup elements, such as charge-coupled devices (CCDs), through a lens 2 and an iris 3 in a lens block 1, and then image pickup output signal S1, which represents an image of a field of view including an image of the subject, is provided to a signal separation/automatically-gain control circuit 5.

The signal separation/automatically-gain control circuit 5 sample holds the image pickup output signal S1, and simultaneously controls gain by control signal from an auto iris "AE" (not shown) so that the image pickup output signal S1 has predetermined gain. Therefore, the signal separation/automatically-gain control circuit 5 supplies image pickup output signal S2 obtained in the above manner to a digital camera processing circuit 7 through an analog-to-digital conversion circuit 6.

The digital camera processing circuit 7 forms brightness signal "Y" and chroma signal "C" based on the image pickup output signal S2, and sends out the brightness signal Y and the chroma signal C as video output signal S3 through a digital-to-analog conversion circuit 8.

In addition, the digital camera processing circuit 7 supplies brightness signal Y, and two color difference signals "R-Y" and "B-Y" to a follow-up control circuit 11 as subject follow-up detection signal S4. Based on the subject follow-up detection signal S4, The follow-up control circuit 11 generates, a follow-up control signal S5 for a panning drive motor 12A and a tilting drive motor 12B provided for the lens block 1.

The follow-up control circuit 11 sequentially passes the brightness signal Y and the color difference signals R-Y and B-Y through a low-pass filter 26 and a decimation circuit 27 to supply to a saturation/hue detection circuit 14, so that hue signal HUE and saturation signal SAT are formed. They are stored in an image memory 15 together with the brightness signal Y as subject follow-up control image data S10 for each pixel.

Then, the decimation circuit 27 is arranged to process the brightness signal Y, and color difference signals R-Y and B-Y to thin them out by sampling them each several pixels, so that the amount of data to be stored in the image memory 15 is reduced, and further the circuit configuration can be simplified.

The saturation/hue detection circuit 14 is arranged to form the hue signal HUE and the saturation signal SAT by rectangular coordinate/curvilinear coordinate conversion of the color difference signals R-Y and B-Y, so that, in the configuration in the later stage, the subject can be recognized based on visual stimulus, which human beings can perceive, by using the brightness signal Y, the hue signal HUE, and the saturation signal SAT.

Figure 2:
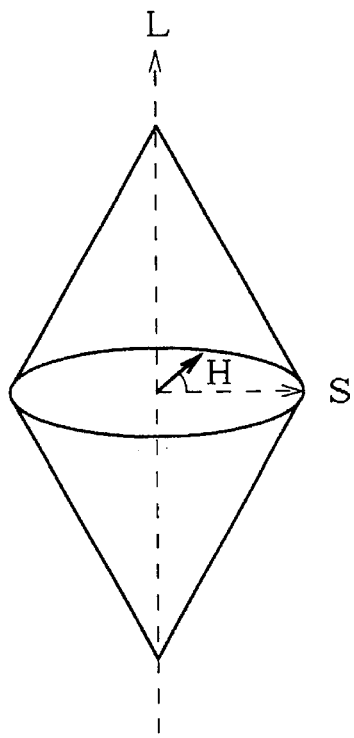
FIG. 2 is a schematic diagram explaining an HLS color coordinate system representing a visual stimulus.

In this connection, the visual stimulus, which the human being can perceive, is expressed by color coordinates, the HLS system, having an "L" axis and an SH plane rectangular thereto, as shown in FIG. 2.

The L axis represents lightness, and corresponds to the brightness signal Y. The "SH" plane is expressed by curvilinear coordinates rectangular to the L axis. In the SH plane, "S" represents saturation, and is expressed by a distance from the L axis; "H" represents hue, and is expressed by an angle assuming the direction of the color difference signal R-Y to be 0°.

When the light source becomes brighter, all colors of a solid in the HLS system become white, and simultaneously the SH plane rises up along the L axis. At that moment, the saturation S decreases. On the other hand, when the light source becomes darker, all colors become black and simultaneously the color coordinates or the SH plane goes down along the L axis. At that moment, the saturation S also decreases.

Based on such characteristics of the HLS color coordinate system, the saturation S and the brightness Y are susceptible to the lightness of the light source, so that it cannot be said that they are best suited as parameters representing features of a subject. On the contrary, the hue H as one representing inherent features quantity of the subject is not susceptible to the lightness of the light source.

Nevertheless, if the color of the subject is near the L axis, that is, it is white, black, or gray, the signal of the hue H becomes meaningless as information. In the worst case, it is found that, for an image with a low S/N ratio, it may have various vectors for the hue H even though it is white.

By utilizing such characteristics of the HLS color coordinate system, the follow-up control circuit 11 extracts features of the subject, and, when the features vary, drives the panning drive motor 12A and the tilting drive motor 12B to follow it, so that image signal accommodating and following up the movement of the subject is obtained as video signal S3.

Figure 3:
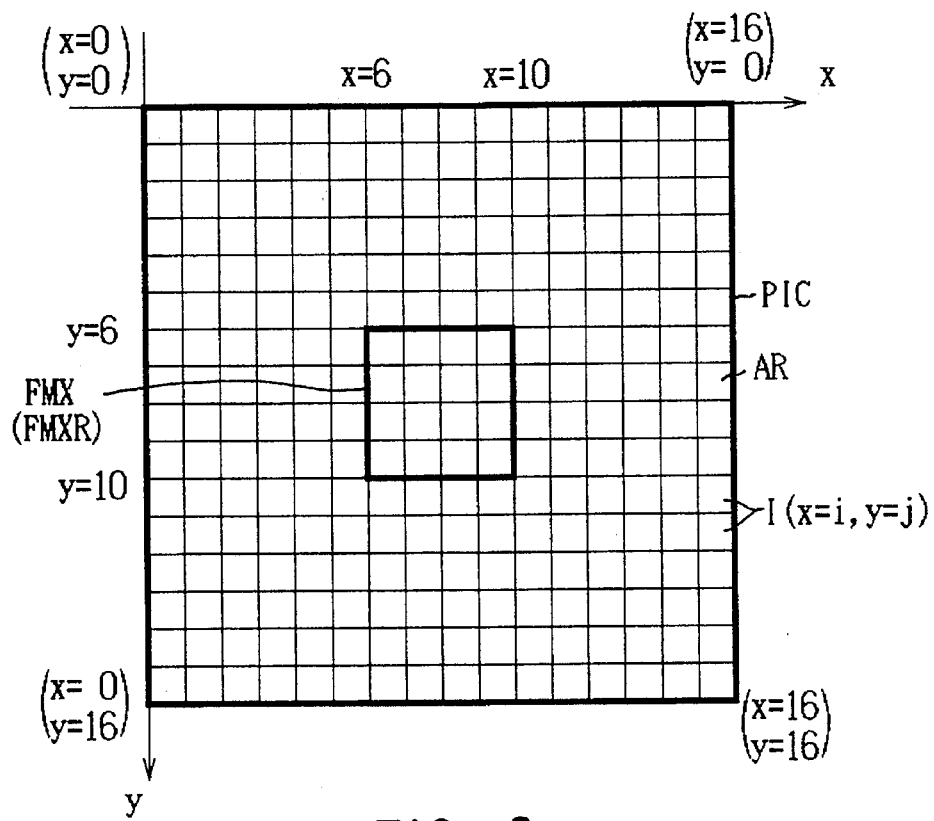
FIG. 3 is a schematic diagram explaining a reference measurement frame FMR.

That is, block specifying signal S11 is supplied from a follow-up signal processing circuit 16 consisting of microprocessor to an address generation circuit 17, so that, as shown in FIG. 3, the pixel information stored in the image memory 15, which constitute subject follow-up control data S10, is read by address signal S12 which divides a display screen PIC substantially formed in the image memory 15 into blocks consisting of small areas AR of predetermined size based on x-y rectangular coordinates (x, y).

Thus, each pixel data in the image memory 15 constituting the display screen PIC is read by the small area AR to be processed as image information of one block for each small area AR.

In this embodiment, the display screen PIC is divided into 16 small areas AR in the "x" and "y" directions, respectively. Thus, by specifying coordinates x=i, y=j of rectangular coordinates (x, y) with regard to 16×16 (=256) small areas AR, it is possible to read out the image information I of the specified small area AR.

Of the image information I (x=i, y=j) thus read out for each small area AR from the image memory 15, the component of hue signal HUE is supplied to a hue histogram generation circuit 19 through the gate circuit 18, while the component of the brightness signal Y is directly supplied to a brightness histogram generation circuit 20.

Figure 4:
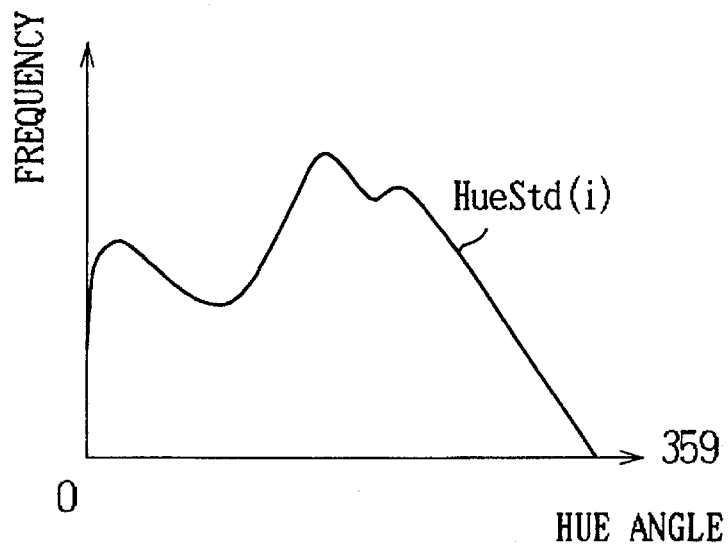
FIG. 4 is a characteristic curvilinear diagram showing standard hue frequency characteristics obtained from the reference measurement frame FMXR shown in FIG.

As shown in FIG. 4, the hue histogram generation circuit 19 determines the hue frequency characteristic HueStd (i) representing the number of pixels with hue angles in a range of 0° to 359° for the hue of pixels in a measurement frame FMX set on the display screen PIC to send as a hue histogram signal S13 to the follow-up signal processing circuit 16.

Thus, the hue histogram generation circuit 19 converts the features on hue, which an image in the measurement frame FMX has, to a hue feature pattern represented by the hue frequency characteristics HueStd (i), and supplies it to the follow-up signal processing circuit 16.

Figure 5:
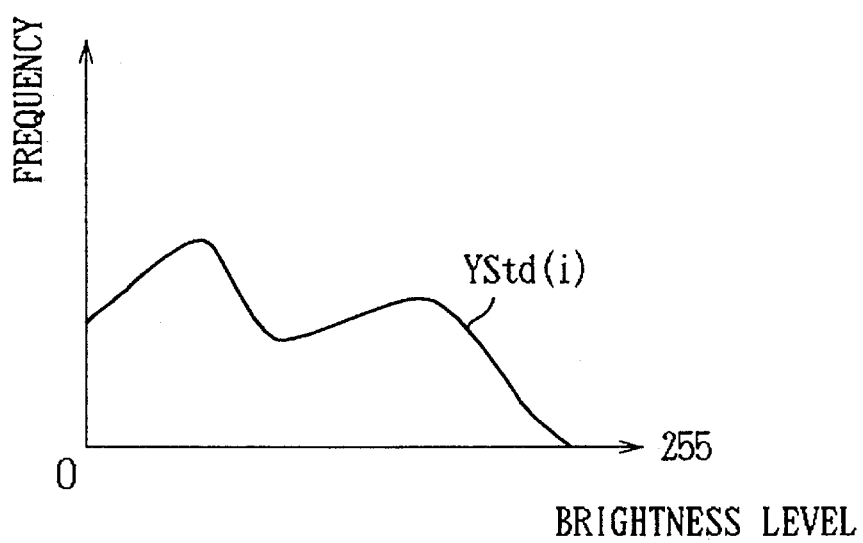
FIG. 5 is a characteristic curvilinear diagram showing standard brightness frequency characteristics obtained from the reference measurement frame FMXR in FIG. 3.

Similarly, as shown in FIG. 5, the brightness histogram generation circuit 20 determines the brightness frequency characteristics YStd (i) representing the number of pixels with a brightness level in a range of 0 to 255 based on brightness signal Y for a pixel in a measurement frame FMX, and then supplies it as brightness histogram signal S14 to the follow-up signal processing circuit 16.

Thus, the brightness histogram generation circuit 20 converts the features on brightness, which an image in the measurement frame FMX has, to a brightness feature pattern represented by the brightness frequency characteristics YStd (i) to supply to the follow-up signal processing circuit 16.

Figure 6:
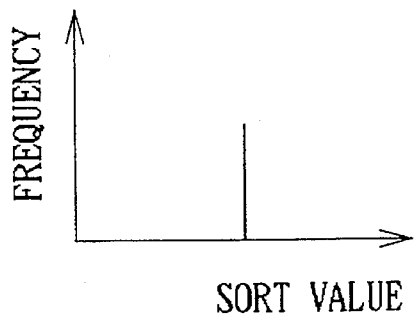
FIG. 6 is a schematic diagram showing a membership function filter used for finding the frequency characteristics.
Figure 6:
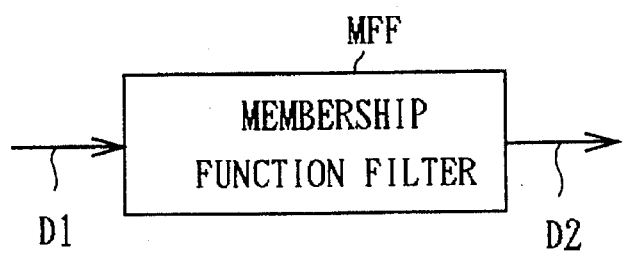
Figure 6:
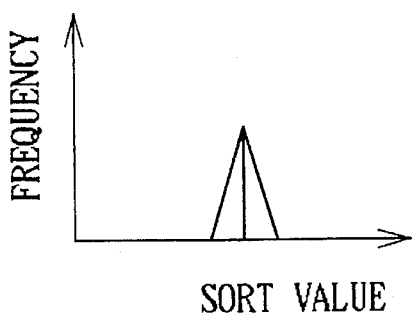

By comparing these components with threshold values representing sort values (that is, hue angles 0° to 359°, and brightness levels 0 to 255), the hue histogram generation circuit 19 and the brightness histogram generation circuit 20 are arranged to sort components of the hue signal HUE and the components of the brightness signal Y into hue angles and brightness levels to be included as generation frequency values. To ameliorate the effect of noise during this sorting processing, as shown in FIGS. 6A to 6C, the hue histogram generation circuit 19 and the brightness histogram generation circuit 20 are arranged to pass the frequency data D1 of each sort value through a membership function filter MFF to send out filter output data D2 obtained at its output terminal as the hue histogram signal S13 and the brightness histogram signal S14, respectively.

This is to avoid a such situation that, in practice, when the values of components of the hue signal HUE and the components of the brightness signal Y are close to the threshold values corresponding to each sort value, the sort values to be included become uncertain depending on presence or absence of noise. As a solution for this, when the frequency is included, it is converted into data to which ambiguity is introduced by a membership function.

Figure 7A:
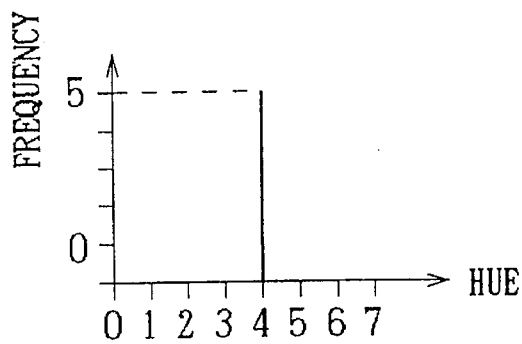
FIGS. 7A and 7B are characteristic curvilinear diagrams showing effects of noise in generating the frequency characteristics.
Figure 7B:
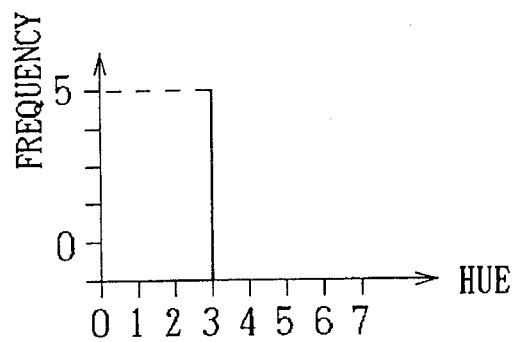

For example, for the components of the hue signal HUE, there may arise such a case where, as shown in FIGS. 7A and 7B, while the hue frequency characteristics Hue (i) for a hue sort value HUE=4 is Hue (i)=5 in the N-th field, the hue frequency characteristics Hue (i) for a hue sort value HUE=3 is determined to be Hue (i)=5 at the (N+1)-th field because there is noise although the image is the same.

Figure 8A:
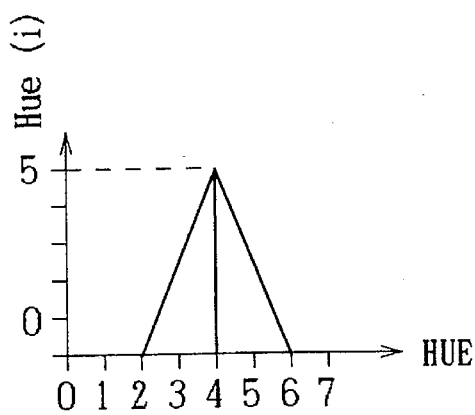
FIGS. 8A and 8B are characteristic curvilinear diagrams showing the frequency characteristics when the membership filter is used.
Figure 8B:
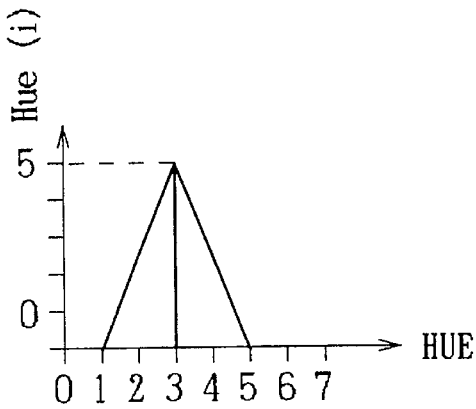

In this case, the hue frequency characteristics Hue (i) obtained by using the filter output data D2, which is the frequency data D1 after passing through the membership function filter MFF, can make the hue frequency distribution substantially the same depending on the presence or absence of noise, as shown in FIGS. 8A and 8B in correspondence to FIGS. 7A and 7B.

Thus, when frequency characteristics are obtained, it is possible to effectively suppress the effect of noise contained in the components of the hue signal HUE and the brightness signal Y.

A hue noise gate signal formation circuit 25 with a comparator construction is provided for the gate circuit 18. It is arranged not to input the hue signal HUE of the pixel to the hue histogram generator circuit 19 by comparing the hue signal HUE read out from the image memory 15 for each pixel with the noise determination signal S15 sent out from the follow-up signal processing circuit 16, and supplying a gate signal S16, which causes the gate circuit 18 to close when the hue signal HUE is at a predetermined level or less, to the gate circuit 18.

When the hue signal HUE detected at the saturation/hue detection circuit 14 is close to the L axis (shown in FIG. 2), there is a possibility that the hue signal HUE may not have meaning as information since it is buried in noise because of having low saturation. Such a meaningless hue signal HUE is removed in the gate circuit 18.

(1–2) Operation of automatic following signal

Figure 9:
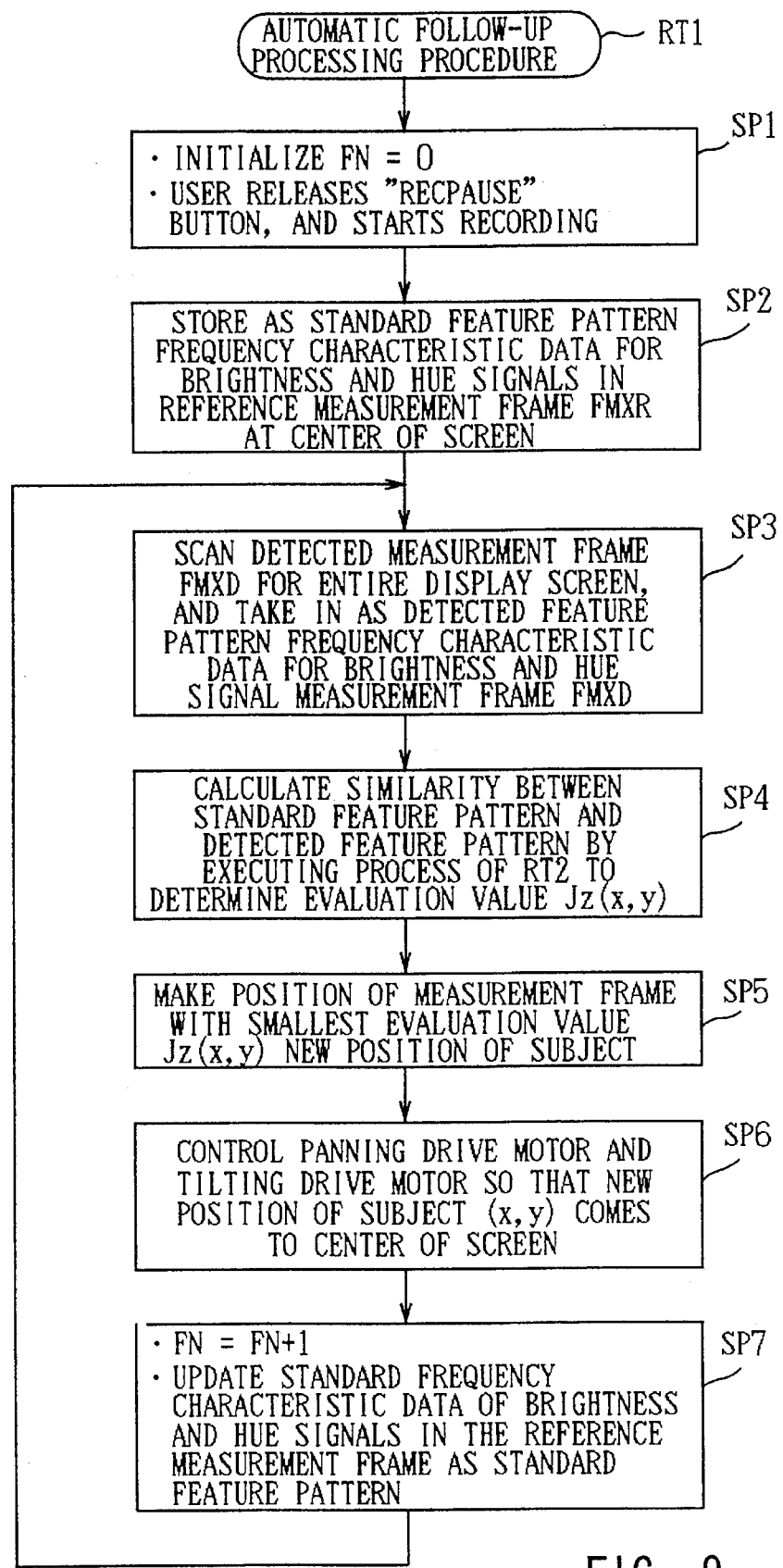
FIG. 9 is a flowchart showing an automatic follow-up processing procedure.

With the above arrangement, by performing the automatic follow-up processing procedure RT1 shown in FIG. 9, the follow-up signal processing circuit 16 forms a brightness-detected feature pattern and a hue-detected feature pattern at the brightness histogram generator circuit 20 and the hue histogram generator circuit 19 based on the brightness signal Y and the hue signal HUE for each pixel taken in the image memory 15. Thereby, they are compared with an image portion in a reference measurement frame so that the panning and tilting operation of the lens block 1 is adaptively controlled to always move the position of a detected measurement frame having an image with the highest similarity to the signal of the reference measurement frame.

That is, when the follow-up signal processing circuit 16 enters the automatic follow-up processing procedure RT1, it initializes the frame number FN to FN =0 in step SP1, and simultaneously waits for the user to release the recording pause state through operation of the recording pause button RECPAUSE.

In this state, if the user releases the recording pause, the follow-up signal processing circuit 16 proceeds to step SP2 to perform such processing, as described for FIGS. 3 to 5, which the reference measurement frame FMXR at the center of the screen is specified by the address generator circuit 17 to send the brightness signal Y and the hue signal HUE corresponding to the pixels in the reference measurement frame FMXR to the brightness histogram generation circuit 20 and the hue histogram generation circuit 19 so as to be taken in the brightness histogram signal S14 and the hue histogram signal S13 having the standard brightness frequency characteristics YStd (i) (FIG. 5) and the standard hue frequency characteristics HueStd (i) (FIG. 4) as the standard feature pattern.

Figure 10:
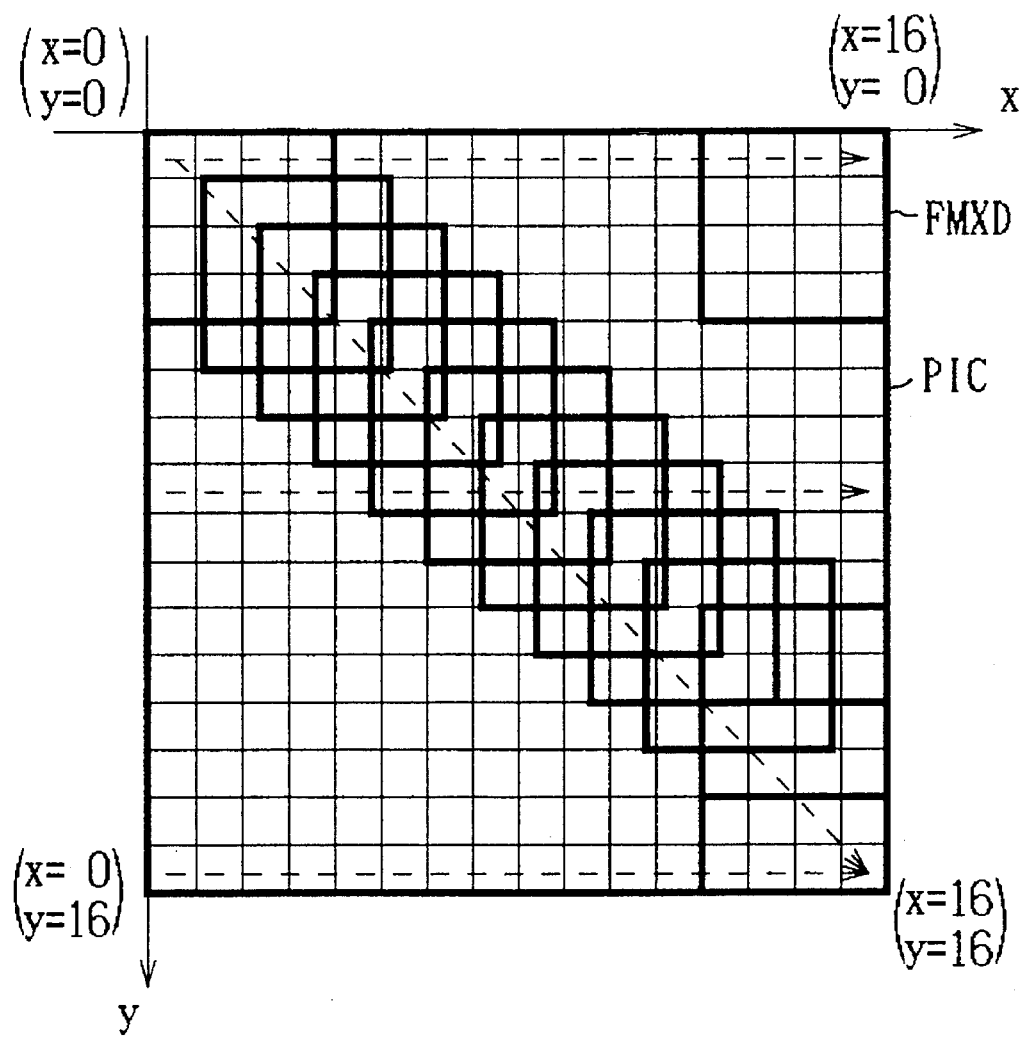
FIG. 10 is a schematic diagram showing a detection measurement frame.

Then, the follow-up signal processing circuit 16 proceeds to step SP3, as shown in FIG. 10, to scan the position of the detection measurement frame FMXD by the address generation circuit 17, thereby extract the pixel information on the display screen PIC for each detection measurement frame FMXD with the detection measurement frame FMXD.

In this embodiment, the detection measurement frame FMXD consists of 4×4 small areas AR similar to the standard detection frame FMXR. The address generation circuit 17 scans the address of small areas at the upper left corner of the detected measurement frame FMXD by sequentially specifying from left to right and from top to bottom.

As a result, the detection measurement frame FMXD scans by sequentially shifting addresses, such as (x, y)=(0, 0), (1, 0), . . . , (12, 0), (0, 1), (1, 1), . . . , (12, 1), . . . , (0, 12), (1, 12), . . . , (12, 12).

Figure 11:
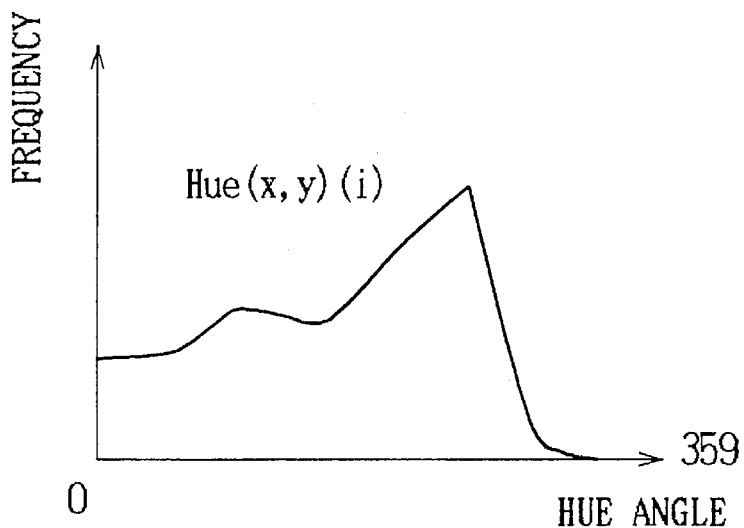
FIG. 11 is a characteristic curvilinear diagram showing detection hue frequency characteristics.
Figure 12:
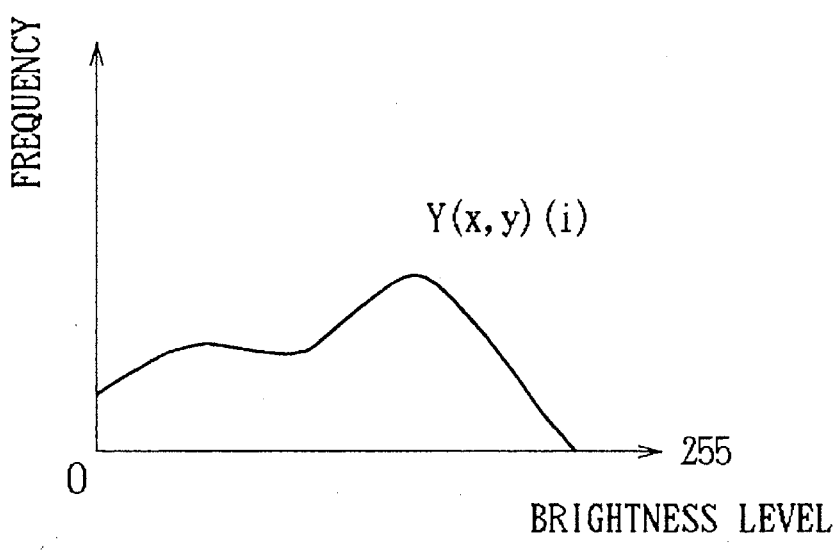
FIG. 12 is a characteristic curvilinear diagram showing detection brightness frequency characteristics.

During such scanning, the follow-up signal processing circuit 16 determines detection hue frequency characteristics Hue (x, y) (i) and detection brightness frequency characteristics Y (x, y) (i), as shown in FIGS. 11 and 12, for the hue information and the brightness information of the image in the detection measurement frame FMXD moved to the position at the address (x, y).

Here, the detection hue frequency characteristics Hue (x, y) (i) represent the detection feature pattern on the hue of the detection measurement frame FMXD by the generation frequency of all pixels with the hue angle y=0° to 359° contained in the detection measurement frame FMXD.

On the other hand, the detection brightness frequency characteristics Y (x, y) (i) represent the detection feature pattern on the brightness by the generation frequency of all pixels with the brightness level=0 to 255 contained in the detection measurement frame FMXD.

Here, it is arranged that ambiguity is also introduced for the detection hue frequency characteristics Hue (x, y) (i) and the detection brightness frequency characteristics Y (x, y) (i) by performing the filtering processing with the membership function filter MFF so as to reduce the effect of noise, as described for the standard hue frequency characteristics HueStd (x, y) (i) and the standard brightness frequency characteristics Ystd (x, y) (i) with reference to FIGS. 6A to 6C, 7A and 7B, and 8A and 8B.

Subsequently, the follow-up signal processing circuit 16 proceeds to step SP4 to calculate the similarity between the standard feature pattern obtained from the reference measurement frame FMRX and the detection feature pattern obtained from the detection measurement frame FMXD by using a distance calculation formula representing the distance between them, and determines the result of calculation as an evaluation value JZ (x, y).

Then, it is determined that the position of the detection measurement frame FMXD, where the evaluation value JZ (x, y) determined at step SP4 becomes minimum in the display screen PIC at step SP5, is the position of the subject at the current measurement. At the next step SP6, a follow-up signal S5 is supplied to the tilting drive motor 12B and the panning drive motor 12C to the new position of the subject (x, y) at the position of the reference measurement frame FMXR (FIG. 3) set at the center of the display screen PIC.

Then, the follow-up signal processing circuit 16 proceeds to step SP7 to increment the frame number FN to FN=FN+1. Then, after updating the standard frequency characteristics data of the hue signal and the frequency signal (FIGS. 4 and 5) as the standard feature pattern for the image newly coming in the reference measurement frame FMXR, the follow-up signal processing circuit 16 returns to the above described step SP3 to start the next measurement cycle.

Thus, when the subject moves relative to the lens block 1 of the television camera, the follow-up signal processing circuit 16 determines the position of a detection measurement frame FMXD with pixel information having the highest similarity to the pixel information of the reference measurement frame FMXR with regard to the entire display screen PIC, and controls the television camera for panning and tilting to place the detection measurement frame FMXD with the highest similarity at the position of the reference measurement frame FMXR, so that the video camera system VCS can be adaptively operated to move in response to movement of the subject.

On the contrary, if the subject at the position of the reference measurement frame FMXR does not move, since it is possible at step SP4 to obtain the evaluation value JZ (x, y) in which the detected feature pattern obtained from the detection measurement frame FMXD at the same position as the reference measurement frame FMXR has the highest similarity to the standard feature pattern, the follow-up signal processing circuit 16 controls the video camera system VCS with a follow-up control signal S5 to maintain the state where the new subject is continuously in the detection measurement frame FMXR.

(1–3) Similarity detection processing operation

Figure 13:
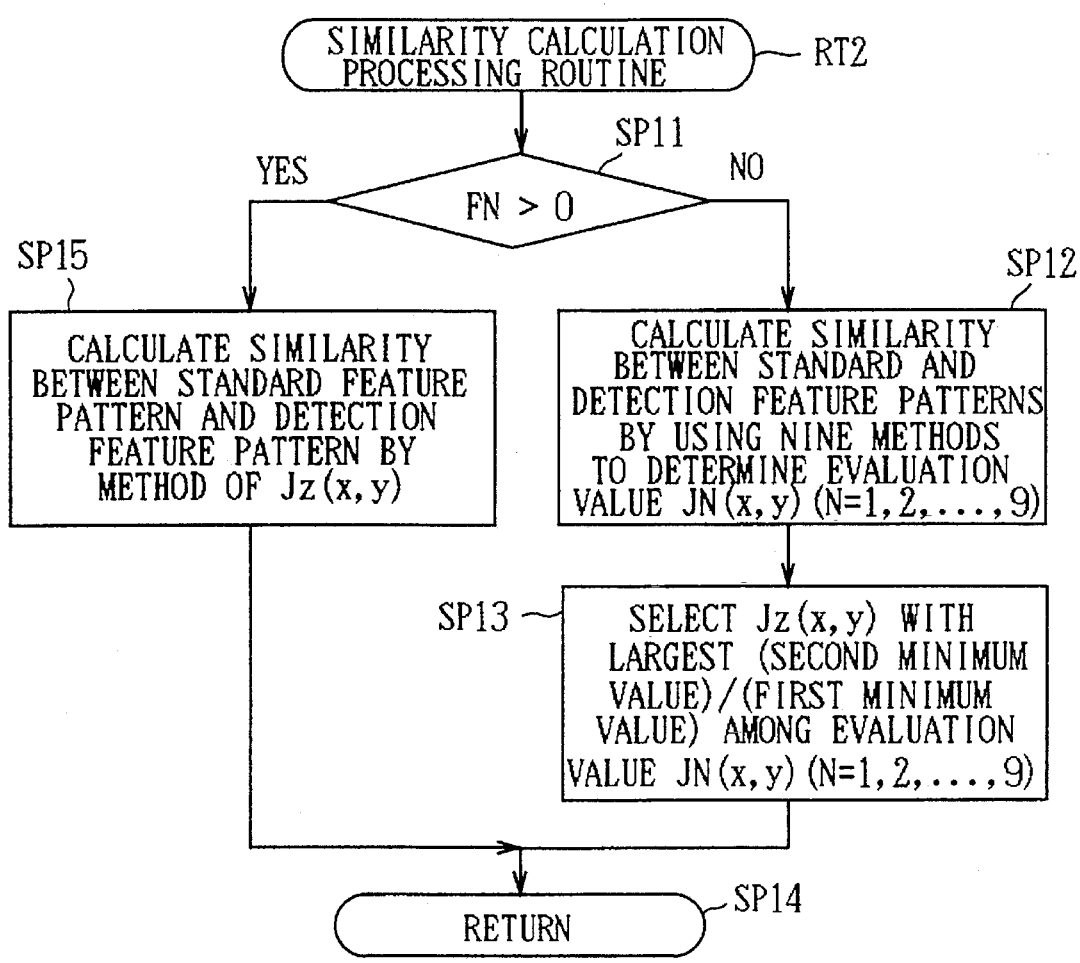
FIG. 13 is a flowchart showing a similarity calculation processing routine.

When the follow-up signal processing circuit 16 proceeds to step SP4, it finds the evaluation value JZ (x, y) by executing the processing of a similarity calculation processing routine RT2 shown in FIG. 13.

That is, when the follow-up signal processing circuit 16 enters the similarity calculation processing routine RT2, first, in step SP11, it determines whether or not the frame number FN is FN>0. If FN=0 (meaning that the first frame is specified), it proceeds to step SP15 to find similarity data of multiple types "N" of frequency characteristics between the standard feature pattern and the detection feature pattern, and obtains an evaluation value JN (N=1, 2, . . . , 9) for each kind of N=1, 2, . . . , 9.

In this embodiment, as shown in FIG. 14, the evaluation value JZ (x, y) found by the follow-up signal processing circuit 16 is selected three kinds of frequency characteristics, that is, brightness frequency characteristics (Y), hue frequency characteristics (Hue), and brightness-hue frequency characteristics (Hue+Y) as elements of distance vector, and each frequency characteristics is selected to be N =9 types of evaluation value JN (x, y)=(J1 (x, y), J2 (x, y), J3 (x, y)), (J4 (x, y), J5 (x, y), J6 (x, y)), and (J7 (x, y), J8 (x, y), J9 (x, y) by applying each of them three kinds of distance calculation method, that is, the histogram Euclidean distance, the histogram hamming distance, and the integral histogram distance (or areal distance).

The follow-up signal processing circuit 16 executes the calculation of Euclidean distance by the following procedure.

First, for the brightness signal, as in the following equation:

$$J1(x,y) = \sum_{i=0}^{255} (Y(x,y)(i) - YStd(i))^2 \quad (1)$$

for each detected measurement frame FMXD, the Euclidean distance J1 (x, y) is found by adding, to the square value of difference corresponding to the absolute values of difference between the detection brightness frequency characteristics Y (x, y) (i) and the standard brightness frequency characteristics YStd (i) corresponding to the brightness level, y=0 to 255. This is obtained as an information evaluation value representing the similarity of the brightness information in the detected measurement frame FMXD at the position of address (x, y) for the brightness information of an image in the reference measurement frame FMXR.

Furthermore, for the hue information of the detection measurement frame FMXD, the follow-up signal processing circuit 16 finds the Euclidean distance J2 (x, y) by adding, to the hue angle, i=0° to 359° squares of difference as values corresponding to the absolute values of difference between the detected hue frequency characteristics Hue (x, y) (i) of the detected measurement frame FMXD at the position of address (x, y) and the standard hue frequency characteristics HueStd (i), as represented by the following equation:

$$J2(x,y) = \sum_{i=0}^{359} (\text{Hue}(x,y)(i) - \text{Hue}Std(i))^2$$

thereby the information representing the similarity of the detection feature pattern of an image, which the detection measurement frame FMXD at the position (x, y) has, to the standard hue pattern, which an image in the reference measurement frame FMXR has, is formed.

In addition, for the combination of brightness signal and hue signal, the follow-up signal processing circuit 16 forms information representing the similarity to the feature pattern for combination of the brightness Y and the hue HUE by calculating the sum of Euclidean distances J1 (x, y) and J2 (x, y) determined for the brightness Y and the hue HUE according to Equations (1) and (2) as in the following equation:

$$\begin{aligned}J3(x,y) &= \sum_{i=0}^{255}(Y(x,y)(i) - YStd(i))^2 + \\ &\quad \sum_{i=0}^{359}(\text{Hue}(x,y)(i) - \text{Hue}Sted(i))^2 \\ &= J1(x,y) + J2(x,y)\end{aligned} \quad (3)$$

(Provided that Hue*Sted*(i) ≠ 0 at "i")

to determine an Euclidean distance J3 (x, y) for the brightness and hue synthesized signals.

In addition, as the histogram hamming distance calculation method, with regard to the brightness signal, the follow-up signal processing circuit 16 finds a hamming distance J4 (x, y) by finding and adding, for the brightness level y=0 to 255, square value of difference as values corresponding to the absolute values of difference between the detection and standard brightness frequency characteristics [Y (x, y) (i)] and [TStd (i)] representing presence or absence of frequency (that is, "1" or "0"), as represented by the following equation:

$$J4(x,y) = \sum_{i=0}^{255} ([Y(x,y)(i)] - [YStd(i)])^2 \quad (4)$$

Also, with regard to the hue signal, the follow-up signal processing circuit 16 finds a hamming distance J5 (x, y) by finding and adding, for the hue angle i=0° to 359°, square value of difference as values corresponding to the absolute values of difference between the detection and standard hue frequency characteristics [Y (x, y) (i)] and [TStd (i)] representing presence or absence of frequency, as represented by the following equation:

$$J5(x,y) = \sum_{i=0}^{359} ([\text{Hue}(x,y)(i)] - [\text{Hue}Std(i)])^2 \quad (5)$$

Furthermore, with regard to a synthesized signal of the brightness signal and the hue signal, the follow-up signal processing circuit 16 finds a hamming distance J6 (x, y) for the brightness and hue synthesized signal by finding the sum of the hamming distances J4 (x, y) and J5 (x, y) for the brightness signal and the hue signal, as represented by the following equation:

$$\begin{aligned}J6(x,y) &= \sum_{i=0}^{255} ([Y(x,y)(i)] - [YStd(i)])^2 + \\ &\quad \sum_{i=0}^{359} ([\text{Hue}(x,y)(i)] - [\text{Hue}Sted(i)])^2 \\ &= J4(x,y) + J5(x,y)\end{aligned} \quad (6)$$

(Provided that Hue*Sted*(i) ≠ 0 at "i")

Furthermore, as the integral histogram distance calculation method, the follow-up signal processing circuit 16 finds an integral distance J7 (x, y) by finding, for the brightness level y=0 to 255, square value of difference as values corresponding to the absolute values of difference between total frequencies of the detection and standard brightness frequency characteristics Y (i) and YStd (i), as represented by the following equation:

$$J7(x,y) = \left( \sum_{i=0}^{255} Y(x,y)(i) - \sum_{i=0}^{255} YStd(i) \right)^2 \quad (7)$$

For the hue signal, the follow-up signal processing circuit 16 finds an integral distance J8 (x, y) by finding, for the hue angle i=0° to 359°, square value of difference as values corresponding to the absolute values of difference between total frequencies for the detection and standard hue frequency characteristics Hue (i) and HueStd (i), as represented by the following equation:

$$J8(x,y) = \left( \sum_{i=0}^{359} \text{Hue}(x,y)(i) - \sum_{i=0}^{359} \text{Hue}Std(i) \right)^2 \quad (8)$$

Furthermore, for synthesized signal of the brightness signal and the hue signal, the follow-up signal processing circuit 16 finds an integral distance J9 (x, y) for the brightness and hue synthesized signal by finding an integral distance J9 (x, y) for the brightness signal and the hue signal, as represented by the following equation:

$$J9(x,y) = \left( \sum_{i=0}^{255} Y(x,y)(i) - \sum_{i=0}^{255} YStd(i) \right)^2 + \tag{9}$$

$$\left( \sum_{i=0}^{359} Hue(x,y)(i) - \sum_{i=0}^{359} HueStd(i) \right)^2$$

$$= J7(x,y) + J8(x,y)$$

(Provided that $HueSted(i) \neq 0$ at "i")

As specific examples of calculation of these distances J1 (x, y) to J9 (x, y), as shown in FIGS. 15A and 15B, when a case is considered where the standard hue frequency characteristics HueStd and the detection hue frequency characteristics Hue (x, y) (i) have the feature frequency patterns [0, 0, 0, 5, 3, 0, 0, 0] and [0, 0, 0, 3, 4, 0, 0, 1] with regard to the hue angles Hue=0, 1, 2, 3, 4, 5, 6, 7, the evaluation value J2 (x, y) based on the hue Euclidean distance becomes the value represented as following equation:

$$J2(x,y) = \left( \sum_{i=0}^{7} Hue(x,y)(i) - HueStd(i) \right)^2 \tag{10}$$

$$= (0-0)^2 + (0-0)^2 + (0-0)^2 + (3-5)^2 +$$
$$(4-3)^2 + (0-0)^2 + (0-0)^2 + (1-0)^2$$
$$= 6$$

the evaluation value J5 (x, y) based on the hue hamming distance becomes the value represented as following equation:

$$J5(x,y) = \left( \sum_{i=0}^{7} ([Hue(x,y)(i)] - [HueStd(i)] \right)^2 \tag{11}$$

$$= ((0-0) + (0-0) + (0-0) + (1-1) +$$
$$(1-1) + (0-0) + (0-0) + (1-0)$$
$$= 1$$

and the evaluation value J8 (x, y) based on the hue integral distance becomes the value represented as following equation:

$$J8(x,y) = \left( \sum_{i=0}^{7} \left( Hue(x,y)(i) - \sum_{i=0}^{7} HueStd(i) \right) \right)^2 \tag{12}$$

$$= ((0+0+0+5+3+0+0+0) -$$
$$(0+0+0+3+4+0+0+1))^2$$
$$= 0$$

Figure 16:
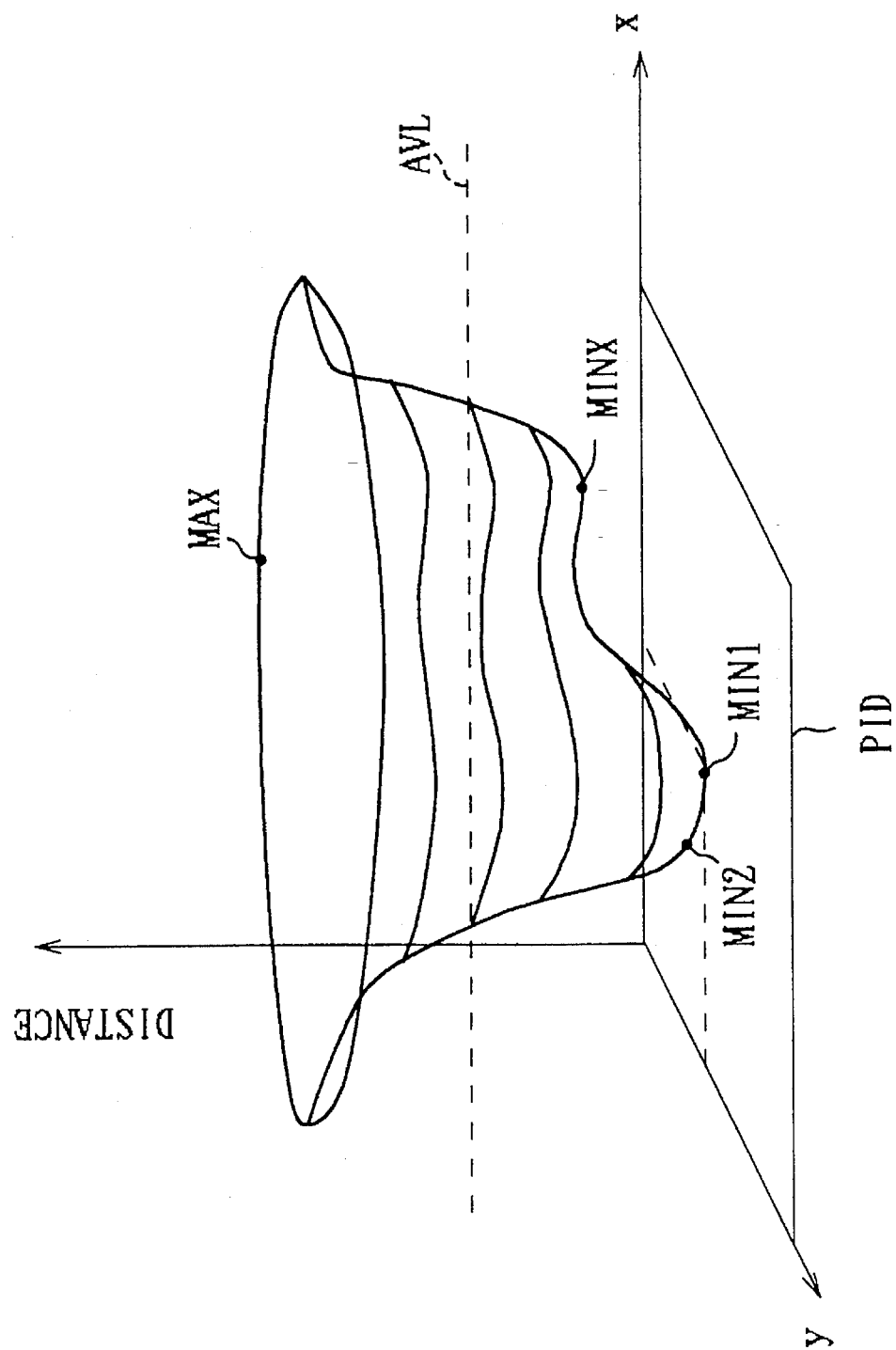
FIG. 16 is a schematic perspective view showing distance data found on the display screen.

Thus, in the state where nine types of distance data JN (x, y) (x=0, 1, ..., 12, y=0, 1, ..., 12, and N=1, ..., 9) are obtained for all detection measurement frames FMXD in the scan position (x, y) (x =0, 1, ..., 12 and y=0, 1, ..., 12), the follow-up signal processing circuit 16 proceeds to step SP13 (FIG. 13) to determine the distance data JZ of nine types of distance data JN (x, y) in which the evaluation value=the second minimum value MIN2/the first minimum value MIN1 becomes the largest, as shown in FIG. 16, and then returns to step SP5 of the main routine (FIG. 9) through step SP14. In FIG. 12, MINX and MAX are the local minimum value and the maximum value of the distance data on the display screen PIC, and AUV is the average value.

On the contrary, when the frame number is FN>0 (that is, the frame is the one after the initialized frame (FN=1, 2, .. ., )), in steps SP12 and SP13, the evaluation value JZ (x, y) is determined by calculating the similarity between the standard and detection feature patterns according to the distance calculation methods selected for the frame number FN=0.

According to the above arrangement, if the user starts recording after first manipulating the camera so that the subject is contained in the reference measurement frame FMXR at the center of the display screen PIC, the video camera system can be adaptively operated to the movement of the subject because the follow-up signal processing circuit 16 can surely detect the moved position by comparing the detection feature pattern and the standard feature pattern both obtained based on the frequency characteristic data of the brightness signal and the hue signal even if the subject moves within the display screen PIC thereafter.

Therefore, no complicated circuit configuration is needed.

Furthermore, according to the above arrangement, since the standard pattern is sequentially updated as time passes, even if the subject changes its direction, becomes closer and larger, or causes any other changes (in the case of a person, for example, removing a jacket, etc.), such change can be surely followed up.

2 Second embodiment

Figure 17:
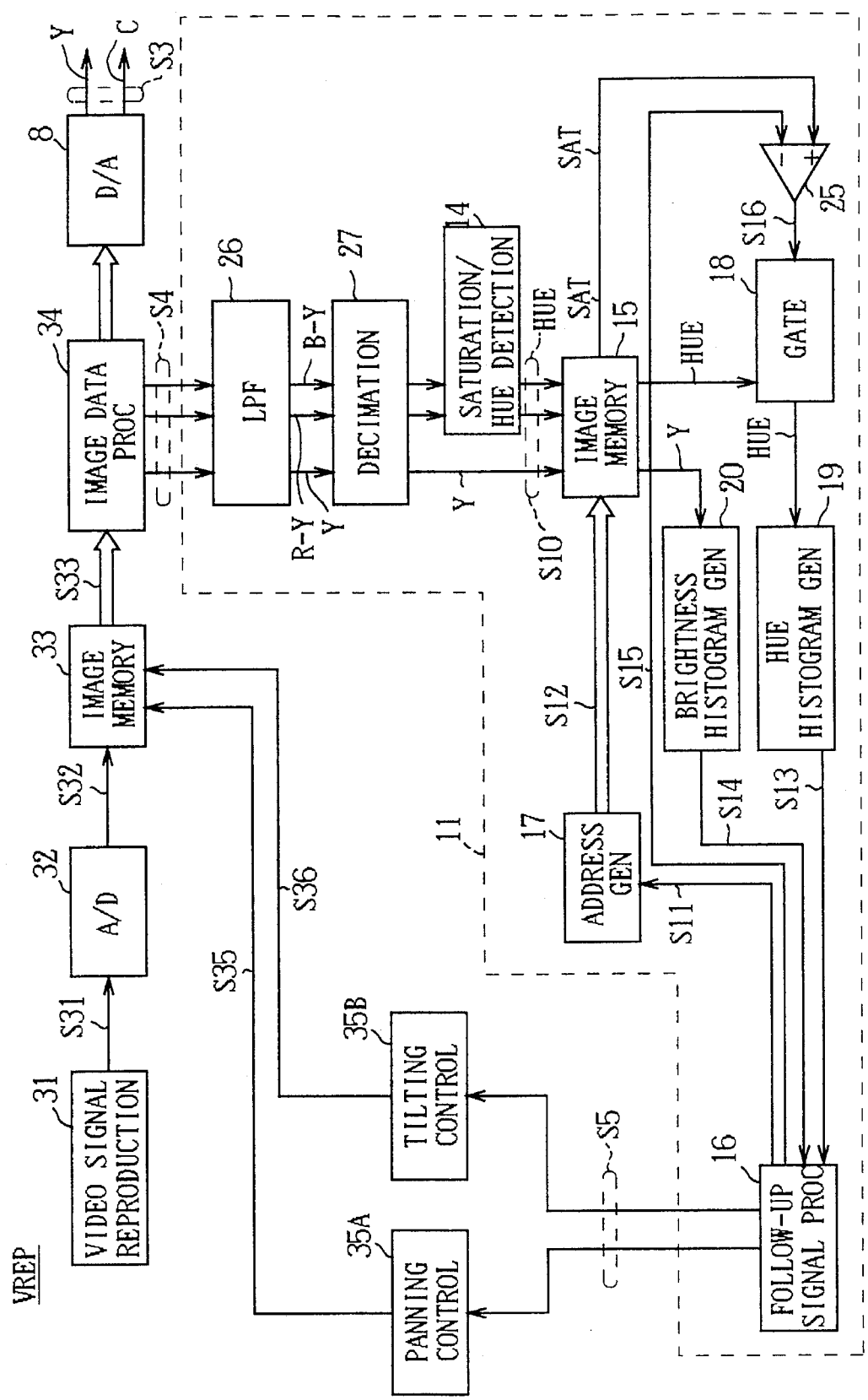
FIG. 17 is a block diagram showing a second embodiment.

FIG. 17 shows the second embodiment in which the video signal follow-up processing device is applied to a video signal reproduction system.

In the video signal reproduction system VREP of FIG. 17, which components corresponding to those in FIG. 1 are referenced by the same reference numbers, for example, reproducing video signal S31 obtained from the video signal reproduction device 31 consisting of a video tape recorder is converted into digital video signal S32 at the analog-to-digital conversion circuit 32, and then written to an image memory 33. And image data S33 read out from the image memory 33 is supplied to an image data processing circuit 34.

Here, similarly as described for the digital camera processing circuit 7 of FIG. 1, the image data processing circuit 34 forms brightness signal Y and chroma signal C based on the image data S33 to send as video signal S3 through a digital-to-analog conversion circuit 8, and simultaneously supplies brightness signal Y and color difference signals R-Y and B-Y as subject follow-up detection signal S4 to the follow-up control circuit 11. The follow-up control circuit 11 generates follow-up control signal S5 for a panning control circuit 35A and a tilting control circuit 35B based on the subject follow-up detection signal S4.

With this arrangement, when the video signal reproduction device 31 sends out the reproducing video signal S31 through the reproducing operation to store in the image memory 33, and then supplies it to the image data processing circuit 34, the follow-up signal processing circuit 16 executes the automatic follow-up processing procedure RT1 in exactly the same manner as described above with reference to FIGS. 9 and 13, thereby a brightness detection feature pattern and a hue detected feature pattern are formed at the brightness histogram generation circuit 20 and the hue histogram generation circuit 19 based on the brightness signal Y and the hue signal HUE of each pixel taken in the image memory 15. Therefore a field of view image read out from the image memory 33 is changed with a panning control circuit 35A and a tilting control circuit 35B so as to move an image in the detection measurement frame with the highest similarity to the position of the reference measurement frame when compared to the image area in the reference measurement frame.

Here, in determining the detection measurement frame with the highest similarity, the follow-up signal processing circuit 16 selects a most suitable calculation method for the image currently processed among the distance calculation methods described for FIGS. 14, 15A and 15B, and 16.

According to the arrangement of FIG. 17, it is possible to attain a video signal reproduction system which can always display a subject specified by the user at the center of the display screen among the image signals reproduced from the video signal reproduction apparatus 31, so that the functions of the video signal reproduction apparatus can be further easily adapted to usage by the user.

3 Third embodiment

Figure 18:
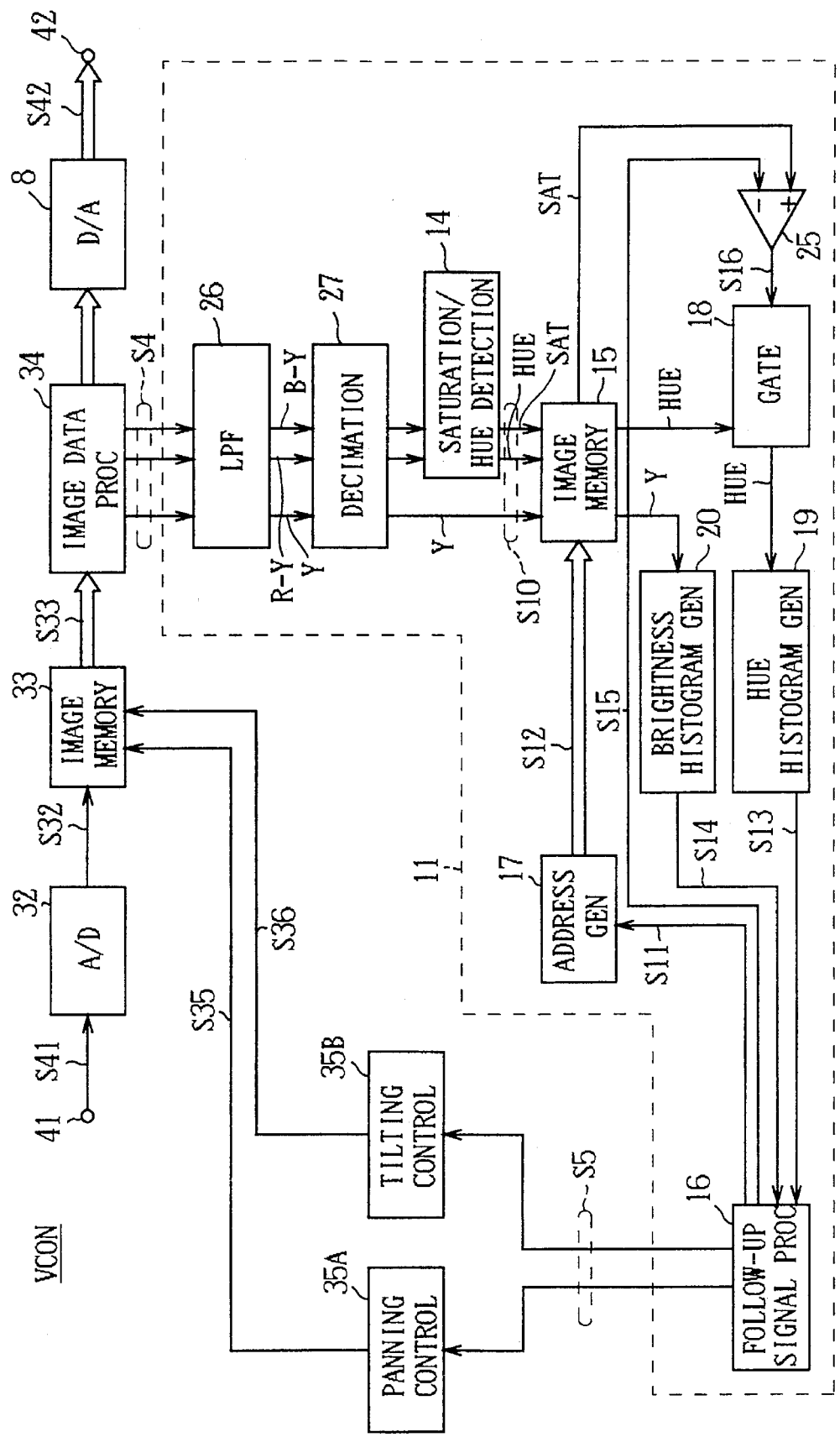
FIG. 18 is a block diagram showing a third embodiment.

FIG. 18 shows the third embodiment. In this case, the signal follow-up processing apparatus according to this invention is applied to a video signal conversion system VCON.

As components corresponding to those of the video signal reproduction system of FIG. 17 are referenced by the same reference numbers, the video signal conversion system VCON converts video input signal S41 arriving at a video input terminal 41 from outside into the digital video signal S32 at the analog-to-digital converter circuit 32, and then takes into the image memory 33. Also, the video signal conversion system VCON is arranged to process the image data S33 read out from the image memory 33 at the image data processing circuit 34, and then send out outside as conversion video output signal S42 consisting brightness signal Y and a chroma signal C from a video output terminal 42 at the digital-to-analog conversion circuit 8.

In the arrangement of FIG. 18, based on the image taken in the image memory 44 from the video input terminal 44, the follow-up signal processing circuit 16 can convert the image of a subject projected in the image described above into the conversion video output signal on the basis of the image data S33 read out from the image memory 11 by the method of always projecting at the center, by executing the automatic follow-up procedure RT1 shown in FIG. 9 and the similarity calculation processing routine shown in FIG. 13, and then send out from the video output terminal 42, in a similar manner to that described for FIG. 17.

Thus, according to the arrangement of FIG. 18, it is possible to attain a video signal conversion system which can easily convert the video input signal S41 arriving at the video input terminal 41 into an image conveniently projected as an user-specified subject at the center of the screen.

4 Other embodiments

In the first embodiment described above, this invention is applied to a case where a subject is tracked to the center of the display screen PIC by panning and tilting the television camera using the result of detection of the moved position of the subject. However, this invention is not only limited to this, but the position of a detection measurement frame FMXD having the highest similarity may be determined by forming a standard feature pattern and a detection feature pattern based on autofocus information or auto-iris information to compare, so that the auto-focusing or auto-iris is automatically controlled based on positional information.

Furthermore, in the embodiment described above, the follow-up signal processing circuit 16 is arranged to use the second minimum value MIN2/the first minimum value MIN1 as the evaluation value in step SP13. However, this invention is not only limited to this, but the average value AVL/the minimum value MIN1, or the maximum value MAX/the minimum value MIN1 may be used.

Furthermore, in the embodiment of FIG. 1, as the means for being followed the image of a subject to the center of the display screen PIC, the lens block 1 is panning and tilting driven by the panning drive motor 12A and the tilting drive motor 12B based on the pixel information obtained from the pixel information forming means consisting of the lens block 1, the signal separation/automatic gain control circuit 5, the analog-to-digital conversion circuit 6, and the digital camera processing circuit 7. However, this invention is not only limited to this, but a field of view image may be formed in an image memory by once storing the image output signal, which is obtained from the lens block 1 constituting the pixel information forming means, in the image memory, so that the image of the subject is followed the center of the display screen PIC by controlling the position where the image data in the image memory is read out with a follow-up control signal obtained based on the standard feature pattern and the detection feature pattern formed by using the pixel information in the image memory at the follow-up control circuit 11.

While there has been described in connection with the preferred embodiments of the invention, it will be obvious to those skilled in the art that various changes and modifications may be aimed, therefore, to cover in the appended true spirit and scope of the invention.

What is claimed is:

1. A camera apparatus comprising:

pixel information forming means for forming pixel information constituting a display screen based on pickup output signal obtained through a lens block;

reference measurement frame setting means for setting a reference measurement frame with a predetermined size on a predetermined position on said display screen;

detection measurement frame setting means for setting a detection measurement frame with a predetermined size on said display screen;

standard frequency characteristic data forming means for forming standard frequency characteristic data for a brightness level and/or hue angle based on brightness and/or hue information on an image in said reference measurement frame;

detection frequency characteristic data forming means for forming detection frequency characteristic data for a brightness level and/or hue angle based on brightness and/or hue information on an image in said detection measurement frame;

similarity calculating means for calculating the similarity of said standard frequency characteristic data and/or said detection frequency characteristic data by several methods;

effective similarity calculation method selection means for selecting the most effective similarity data on the screen among a plurality of similarities obtained from said similarity calculation;

detection measurement frame determination means for determining said detection measurement frame with a higher similarity by using the similarity calculation method selected by said effective similarity calculation method selection means; and pixel information modification control means for controlling said pixel information forming means so as to match the position of said pixel information on the determined detection measurement frame with the position of said reference measurement frame.

2. The camera apparatus according to claim 1, wherein:

said detection measurement frame setting means sets a plurality of detection measurement frame at predetermined positions on said display screen which are different from each other;

said detection frequency characteristic data forming means forms said detection frequency characteristic data from each of said plurality of detection measurement frames;

said similarity calculating means finds similarity of the standard frequency characteristic data and/or said detection frequency characteristic data by plural way of calculation method;

said effective similarity calculation method selection means selects the most effective similarity calculation method on the screen;

said detection measurement frame determination means finds similarity by using the calculation method selected by said effective similarity selection means to determine a detection measurement frame having detection frequency characteristic data with the highest similarity; and said pixel information modification control means controls said pixel information formation means so as to correspond the position of image information of the above determined detection frame to the position of said reference measurement frame.

3. The camera apparatus according to claim 2, wherein:

said pixel information formation means decreases the frequency band by filtering the brightness signal and the hue signal and thins out, and then converts said color difference signal into hue signal and saturation signal.

4. The camera apparatus according to claim 3, wherein:

said pixel information modification control means moves a field of view image projected in said display screen in such a manner that an image projected in said detection measurement frame determined by said detection measurement frame detection means is projected at the position of said reference measurement frame.

5. The camera apparatus according to claim 4, wherein:

said pixel information modification control means moves a field of view image projected in said display screen in such a manner that an image projected in said detection measurement frame determined by said detection measurement frame detection means is projected at the position of said reference measurement frame, by panning and tilt-controlling said lens block unit of said pixel information formation means based on the result of determination of said detection measurement frame detection means.

6. The camera apparatus according to claim 2, wherein:

said standard frequency characteristic data forming means and/or said detection frequency characteristic data forming means use a membership function when the frequency of pixel data obtained by said pixel information forming means are counted.

7. The camera apparatus according to claim 2, wherein:

said pixel information forming means sends out brightness, hue, and saturation pixel information as said pixel information, and said standard frequency characteristic data forming means for hue signal and/or said detection frequency characteristic data forming means counts the frequency of said hue pixel information, said hue pixel information being uncounted because of judging that the color is absent when the saturation pixel information is at a predetermined threshold value or less.

8. The camera apparatus according to claim 2, wherein:

said similarity calculation means defines each of the standard frequency characteristic data and the detection frequency characteristic data as vector to calculate Euclidean distance, Hamming distance, and integral distance.

9. The camera apparatus according to claim 2, wherein:

said effective similarity calculation method selection means selects a calculation method which, with regard to the distance between the standard frequency characteristic data and the detection frequency characteristic data on a screen, the ratio of the first minimum distance representing the smallest distance (highest similarity) to the second minimum distance representing the second smallest distance (the second minimum distance/the first minimum distance) becomes largest.

10. The camera apparatus according to claim 2, wherein:

said effective similarity calculation method selection means selects a calculation method which, with regard to the distance between the standard frequency characteristics data and the detection frequency characteristic data, the ratio of the average distance representing an average value of the distance in one screen to the minimum distance representing the smallest distance (the average distance/the minimum distance) becomes largest.

11. The camera apparatus according to claim 2, wherein:

said effective similarity calculation method selection means selects a calculation method which, with regard to the distance between the standard frequency characteristic data and the detection frequency characteristic data on a screen, the ratio (the maximum distance/ the minimum distance) of the minimum distance representing the smallest distance (that is, highest similarity) to the maximum distance representing the largest distance (that is, lowest similarity) becomes the largest.

12. The camera apparatus according to claim 2, wherein:

said reference measurement frame setting means forms said reference measurement frame at the center of said display screen.

13. The camera apparatus according to claim 2, wherein:

said detection measurement frame detection means calculates the distance of said detection frequency characteristic data to said standard frequency characteristic data for each of said plurality of detection measurement frames with the distance calculation method selected by said effective similarity calculation method selection means, and determines a detection measurement frame with small distance as said detection measurement frame with high similarity.

14. A video signal reproducing apparatus comprising:

pixel information formation means for forming pixel information obtained through a video signal reproduction device, which constitutes a display screen, based on reproducing video signal to send out as video output signal;

reference measurement frame setting means for setting a reference measurement frame with a predetermined size at a predetermined position on said display screen;

detection measurement frame setting means for setting a detection measurement frame with a predetermined size on said display screen;

standard frequency characteristic data formation means for forming standard frequency characteristic data for a brightness level and/or hue angle based on brightness and/or hue information on an image in said reference measurement frame;

detection frequency characteristic data formation means for forming detection frequency data for a brightness level and/or hue angle based on brightness and/or hue information on an image in said detection measurement frame;

similarity calculating means for calculating the similarity of said standard frequency characteristic data and/or said detection frequency characteristic data by several methods;

effective similarity calculation method selection means for selecting the most effective similarity data on the screen among a plurality of similarities obtained by said similarity calculation;

detection measurement frame determination means for determining said detection measurement frame with a higher similarity by using the similarity calculation method selected by said effective similarity calculation method selection means; and pixel information modification control means for controlling said pixel information forming means so as to correspond the position of said pixel information on the determined detection measurement frame with the position of said reference measurement frame.

15. The video signal reproducing apparatus according to claim 14, wherein:

said detection measurement frame setting means sets a plurality of detection measurement frame at predetermined positions on said display screen which are different from each other;

said detection frequency characteristic data formation means forms said detection frequency characteristic data from each of said plurality of detection measurement frames;

said similarity calculating means determines similarity of the standard frequency characteristic data and/or said detection frequency characteristic data;

said effective similarity calculation method selection means selects the most effective similarity calculation method on the screen;

said detection measurement frame determination means finds similarity by using the calculation method selected by said effective similarity selection means to determine a detection measurement frame having detection similarity characteristic data with the highest similarity; and said pixel information formation means is controlled so as to correspond the position of image information of the above detection measurement frame determined by said pixel information modification control means, to the position of said reference measurement frame.

16. The video signal reproducing apparatus according to claim 15, wherein:

said pixel information formation means decreases the frequency band by filtering the brightness signal and the hue signal and thins out, and then converts said color difference signal into hue signal and saturation signal.

17. The video signal reproducing apparatus according to claim 15, wherein:

said pixel information modification control means moves a field of view image projected in said display screen in such a manner that an image projected in said detection measurement frame determined by said detection measurement frame detection means is projected at the position of said reference measurement frame.

18. The video reproducing apparatus according to claim 15, wherein:

said pixel information modification control means moves a field of view image projected in said display screen in such a manner that an image projected in said detection measurement frame determined by said detection measurement frame detection means is projected at the position of said reference measurement frame, by panning and tilt-controlling said lens block unit of said pixel information formation means based on the result of determination of said detection measurement frame detection means.

19. The video signal reproducing apparatus according to claim 15, wherein:

said standard frequency characteristic data forming means and/or said detection frequency characteristic data forming means use a membership function when the frequency of pixel data obtained by said pixel information forming means are counted.

20. The video signal reproducing apparatus according to claim 15, wherein:

said pixel information forming means sends out brightness, hue, and saturation pixel information as said pixel information, and said standard frequency characteristic data forming means for hue signal and/or said detection frequency characteristic data forming means counts the frequency of said hue pixel information, which is uncounted when the saturation pixel information is at a predetermined threshold value or less because of judging that the color is absence.

21. The video signal reproducing apparatus according to claim 15, wherein:

said similarity calculation means defines each of the standard frequency characteristic data and the detection frequency characteristic data as vector to calculate Euclidean distance, Hamming distance, and integral distance.

22. The video signal reproducing apparatus according to claim 15, wherein:

said effective similarity calculation method selection means selects a calculation method which, with regard to the distance between the standard frequency characteristic data and the detection frequency characteristic data on a screen, the ratio of the first minimum distance representing the smallest distance (highest similarity) to the second minimum distance representing the second smallest distance (the second minimum distance/the first minimum distance) becomes largest.

23. The video signal reproducing apparatus according to claim 15, wherein:

said effective similarity calculation method selection means selects a calculation method which, with regard to the distance between the standard frequency characteristics data and the detection frequency characteristic data, the ratio of the average distance representing an average value of the distance in one screen to the minimum distance representing the smallest distance (the average distance/the minimum distance) becomes largest.

24. The video signal reproducing apparatus according to claim 15, wherein:

said effective similarity calculation method selection means selects a calculation method which, with regard to the distance between the standard frequency characteristic data and the detection frequency characteristic data on a screen, the ratio (the maximum distance/ the minimum distance) of the minimum distance representing the smallest distance (that is, highest similarity) to the maximum distance representing the largest distance (that is, lowest similarity) becomes the largest.

25. A video signal reproducing apparatus according to claim 15, wherein:

said reference measurement frame setting means forms said reference measurement frame at the center of said display screen.

26. The video signal reproducing apparatus according to claim 15, wherein:

said detection measurement frame detection means calculates the distance of said detection frequency characteristic data to said standard frequency characteristic data for each of said plurality of detection measurement frames with the distance calculation method selected by said effective similarity calculation method selection means, and determines a detection measurement frame with small distance as said detection measurement frame with high similarity.

27. A video signal conversion apparatus comprising:

pixel information formation means for forming pixel information constituting a display screen based on video input signal arriving at a video input terminal from outside, to send out as conversion video output signal from a video output terminal;

reference measurement frame setting means for setting a reference measurement frame with a predetermined size on a predetermined position on said display screen;

detection measurement frame setting means for setting a detection measurement frame with a predetermined size on said display screen;

standard frequency characteristic data formation means for forming standard frequency characteristic data for a brightness level and/or hue angle based on brightness and/or hue information on an image in said reference measurement frame;

detection frequency characteristic data formation means for forming detection frequency characteristic data for a brightness level and/or hue angle based on brightness and/or hue information on an image in said detection measurement frame;

similarity calculating means for calculating the similarity of said standard frequency characteristic data and/or said detection frequency characteristic data by several methods;

effective similarity calculation method selection means for selecting the most effective similarity data on the screen among a plurality of similarities obtained from said similarity calculation;

detection measurement frame determination means for determining said detection measurement frame with a higher similarity by using the similarity calculation method selected by said effective similarity calculation method selection means; and pixel information modification control means for controlling said pixel information formation means so as to match the position of the above pixel information on the determined detection measurement frame with the position of said reference measurement frame.

28. The video signal conversion apparatus according to claim 27, wherein:

said detection measurement frame setting means sets a plurality of detection measurement frame at predetermined positions on said display screen which are different from each other;

said detection frequency characteristic data forming means forms said detection frequency characteristic data from each of said plurality of detection measurement frames;

said similarity calculating means finds similarity of the standard frequency characteristic data and/or said detection frequency characteristic data by plural way of calculation method;

said effective similarity calculation method selection means selects the most effective similarity calculation method on the screen;

said detection measurement frame determination means finds similarity by using the calculation method selected by said effective similarity selection means to determine a detection measurement frame having detection frequency characteristic data with the highest similarity; and said pixel information modification control means controls said pixel information formation means so as to correspond the position of image information of the above determined detection frame to the position of said reference measurement frame.

29. The video signal conversion apparatus according to claim 28, wherein:

said pixel information formation means decreases the frequency band by filtering the brightness signal and the hue signal and thins out, and then converts said color difference signal into hue signal and saturation signal.

30. The video signal conversion apparatus according to claim 28, wherein:

said pixel information modification control means moves a field of view image projected in said display screen in such a manner that an image projected in said detection measurement frame determined by said detection measurement frame detection means is projected at the position of said reference measurement frame.

31. The video signal conversion apparatus according to claim 28, wherein:

said pixel information modification control means moves a field of view image projected in said display screen in such a manner that an image projected in said detection measurement frame determined by said detection measurement frame detection means is projected at the position of said reference measurement frame, by panning and tilt-controlling said lens block unit of said pixel information formation means based on the result of determination of said detection measurement frame detection means.

32. The video signal conversion apparatus according to claim 28, wherein:

said standard frequency characteristic data forming means and/or said detection frequency characteristic data forming means use a membership function when the frequency of pixel data obtained by said pixel information forming means are counted.

33. The video signal conversion apparatus according to claim 28, wherein:

said pixel information forming means sends out brightness, hue, and saturation pixel information as said pixel information, and said standard frequency characteristic data forming means for hue signal and/or said detection frequency characteristic data forming means counts the frequency of said hue pixel information, which is uncounted when the saturation pixel information is at a predetermined threshold value or less because of judging that the color is absence.

34. The video signal conversion apparatus according to claim 28, wherein:

said similarity calculation means defines each of the standard frequency characteristic data and the detection frequency characteristic data as vector to calculate Euclidean distance, Hamming distance, and integral distance.

35. The video signal conversion apparatus according to claim 28, wherein:

said effective similarity calculation method selection means selects a calculation method which, with regard to the distance between the standard frequency characteristic data and the detection frequency characteristic data on a screen, the ratio of the first minimum distance representing the smallest distance (highest similarity) to the second minimum distance representing the second smallest distance (the second minimum distance/the first minimum distance) becomes largest.

36. The video signal conversion apparatus according to claim 28, wherein:

said effective similarity calculation method selection means selects a calculation method which, with regard to the distance between the standard frequency characteristics data and the detection frequency characteristic data, the ratio of the average distance representing an average value of the distance in one screen to the minimum distance representing the smallest distance (the average distance/the minimum distance) becomes largest.

37. The video signal conversion apparatus according to claim 28, wherein:

said effective similarity calculation method selection means selects a calculation method which, with regard to the distance between the standard frequency characteristic data and the detection frequency characteristic data on a screen, the ratio (the maximum distance/the minimum distance) of the minimum distance representing the smallest distance (that is, highest similarity) to the maximum distance representing the largest distance (that is, lowest similarity) becomes the largest.

38. The video signal conversion apparatus according to claim 28, wherein:

said reference measurement frame setting means forms said reference measurement frame at the center of said display screen.

39. The video signal conversion apparatus according to claim 28, wherein:

said detection measurement frame detection means calculates the distance of said detection frequency characteristic data to said standard frequency characteristic data for each of said plurality of detection measurement frames with the distance calculation method selected by said effective similarity calculation method selection means, and determines a detection measurement frame with small distance as said detection measurement frame with high similarity.

* * * * *